(12) United States Patent
Kearney et al.

(10) Patent No.: US 7,846,338 B2
(45) Date of Patent: Dec. 7, 2010

(54) ION EXCHANGE PROCESS

(75) Inventors: Michael M. Kearney, Twin Falls, ID (US); Lawrence Velasquez, Twin Falls, ID (US)

(73) Assignee: Amalgamated Research, Inc., Twin Falls, ID (US)

( * ) Notice: Subject to any disclaimer, the term of this patent is extended or adjusted under 35 U.S.C. 154(b) by 558 days.

(21) Appl. No.: 11/986,616

(22) Filed: Nov. 21, 2007

(65) Prior Publication Data
US 2008/0156732 A1 Jul. 3, 2008

Related U.S. Application Data

(60) Provisional application No. 60/860,776, filed on Nov. 22, 2006.

(51) Int. Cl.
*B01J 49/00* (2006.01)

(52) U.S. Cl. ..................................................... 210/677

(58) Field of Classification Search .................. 210/677
See application file for complete search history.

(56) References Cited

U.S. PATENT DOCUMENTS

| | | | | | |
|---|---|---|---|---|---|
| 5,464,530 | A | * | 11/1995 | Stivers | 210/141 |
| 5,635,072 | A | * | 6/1997 | Moran | 210/659 |
| 5,718,828 | A | * | 2/1998 | Jangbarwala et al. | 210/677 |
| 5,951,874 | A | * | 9/1999 | Jangbarwala et al. | 210/662 |
| 2008/0087606 | A1 | * | 4/2008 | Jensen et al. | 210/677 |

* cited by examiner

*Primary Examiner*—Chester T Barry
(74) *Attorney, Agent, or Firm*—TraskBritt

(57) ABSTRACT

A method is described that relates to reducing amounts of regenerant waste or increasing the concentration of regenerant waste from ion exchange processes. A method is described that may allow a batch ion exchange process to compete on these factors with continuous or simulated continuous ion exchange processes, and/or to improve the efficiency in operation continuous or simulated continuous ion exchange processes. A specific application addressed is the treatment of water in the Coal Bed Methane Process.

19 Claims, No Drawings

ION EXCHANGE PROCESS

CROSS-REFERENCE TO RELATED APPLICATION

This application claims the benefit of the filing date of U.S. Provisional Patent Application Ser. No. 60/860,776, filed Nov. 22, 2006, the entire disclosure of which is hereby incorporated herein by this reference.

BACKGROUND

In the energy industry, the Coal Bed Methane Process (CBMP) has been used to recover methane gas from water pumped to the surface from underground coal beds. This water pumped to the surface generally must be treated before returning it to the environment due to contaminants deemed unsuitable for the environment or other uses. This clean-up process may involve the use of an ion exchange apparatus.

Methods for ion exchange of CBMP water can include simple batch ion exchange and/or continuous ion exchange processes such as the Higgins loop. Equipment for a continuous or simulated continuous process is generally more expensive to install and often considered more complicated to operate than a batch process. However, continuous processes are more efficient than simple batch processes so it is understood that they are presently favored over batch processes in spite of capital costs and operating complexities generally associated with them. It is understood that a particular problem for a batch process compared to the continuous processes is that the quantity of regenerant waste stream produced by a batch process is of a much greater volume and is more dilute than continuous processes. Because the regenerant waste often must be transported and discarded in some procedure to comply with environmental regulation, the greater volume of waste produced can make the batch process uneconomical in a typical commercial operation.

A conventional process of batch ion exchange can be described as follows, as will be understood by one of ordinary skill in the art. In this example, the water treated from a CBMP is assumed to contain sodium bicarbonate as the primary contaminant to be removed and reduced in concentration. Also in this example, an acid is used in the process for regeneration which is assumed to be hydrochloric acid. Other regenerates may be considered, for example only, as sulfuric acid, although for acids hydrochloric acid is presently common if the process under consideration is CBMP. As understood by those of ordinary skill in the art, other contaminants, acids, or parameters may be considered relevant. As an example, such process may include:

1. A column is filled with a strong or weak cation resin bed in the hydrogen form, depending on the circumstances.

2. Water from the CBMP is introduced to the column and is passed downflow at some appropriate rate, e.g., 5 to 20 bed volumes/hour. Preferably, the column should be pressurized to avoid evolution of carbon dioxide gas in the column.

3. The resin exchanges the hydrogen in the resin for the cations in the water. Typically sodium makes up the majority of the cations present in the water from the CBMP prior introduction to the column.

4. The water exiting the column contains carbonic acid, which can be decomposed and neutralized to yield carbon dioxide and purified water.

5. The column of resin which is now in the sodium form is regenerated with hydrochloric acid. This regeneration is accomplished by passing a given quantity of the acid through the resin which exchanges hydrogen from the acid for the sodium. The hydrochloric acid which typically is commercially available in a concentrated form is first diluted with water to a typical concentration of 12.5%. The acid is rinsed off the resin using water.

6. The regenerant waste, typically called "brine", exits the column as a profile. The exchanged hydrochloric acid results in a waste containing primarily sodium chloride. This waste increases in concentration of dissolved solids from when the waste exits the column and eventually the profile decreases to essentially zero concentration on the tail end as the final regenerate waste is rinsed from the column.

In commercial operation it is understood that a batch process is considered fairly inefficient compared to continuous processes. It produces a greater volume of waste, which also is a much more dilute waste than in a continuous process. These forgoing distinctions can be considered important efficiency factors in commercial operation.

Note that the amount of hydrochloric acid to be used for regeneration in the batch process is not calculated one to one on the sodium to be stripped from the resin. In order to regenerate the column of resin properly, an excess amount of acid must be added to the column. As a consequence, there is a "leakage" of excess acid on the tail end of the regenerant waste profile. To improve the batch operation somewhat, it is understood to be conventional practice to save the highest concentration acid leakage from the tail end of the regenerant waste profile and use it prior to the next regeneration to obtain a small amount of additional exchange efficiency. This practice is typically called recycle of waste regenerant. The purpose is to take advantage of the residual leaked acid potential in the waste, to give it a second chance to regenerate the resin.

The leading front of the exiting regeneration waste profile is also problematic with the batch process. It is diluted with water and spread out over a profile compared with continuous methods. This dilution results in a dilution of the regenerant waste (brine) and a large volume of regenerant waste.

The overall large volume of waste with low salt (e.g., brine) concentration associated with the batch ion exchange process makes the batch process unacceptable for treatment of water in the CBMP industry, and to our understanding has been purposely avoided for such use.

DETAILED DESCRIPTION OF THE INVENTION

We have prior to this application now discovered a new method for operating a batch process for treating CBMP water to remove certain solids which results in waste volume and waste salt concentrations equivalent to continuous processes known in the art. At first impression, the new method has results that are contrary to what should be expected to one of ordinary skill in the art. Batch processes generally are considered simple to operate, and costs of installation are generally considered low; accordingly, this new method should provide considerable benefits to the industry. Note also that this new method could be applied to continuous processes, and/or for treatment of liquids other than CBMP water.

One example of our new method is described as follows:

1. A column is filled with a strong or weak cation resin bed in the hydrogen form. Column construction and resin selection are conventional, and known to those of ordinary skill in the art. Preferably, a strong cation resin in the hydrogen form is used. The resin may be provided as pellets, beads, fibers, or particles and preferably is a hard, spherical gel type bead. The resin may have a minimum total capacity in the hydrogen form, wet, of 1.9 meq/mL. A preferred resin has an average particle size of about 650 microns, a specific gravity of about 1.22-1.23, and a bulk density of about 49.9 lb/ft3. The resin is preferably a gel comprising a styrene-divinylbenzene copolymer functionalized with acid groups, preferably sulfonate groups. Alternatively, the copolymer may be functionalized with phosphonic acid or arsonic acid groups. A particularly preferred cation exchange resin is sold by The Dow Chemical Company of Midland, Mich. under the trademark DOWEX G-26(H). Less preferably, the cation exchange resin may comprise ethylene copolymerized with an unsaturated carboxylic acid such as acrylic acid.

2. Water for treatment from a CBMP is introduced and passed downflow at some appropriate rate, e.g., 5 to 20 bed volumes/hour, similar to a conventional process as known to those of ordinary skill.

3. The resin exchanges the hydrogen in the resin for the cations in the water, typically sodium makes up the majority of the cations (same as conventional).

4. The water exits as containing carbonic acid which can be decomposed and neutralized to yield carbon dioxide and purified water (same as conventional).

5. The column of resin which is now in the sodium form is regenerated with hydrochloric acid. This regeneration is accomplished by passing a given quantity of the acid through the resin which exchanges for the sodium.

The following describes how an embodiment of our method differs from conventional operation.

6. The hydrochloric acid, commercially available in a concentrated form, is first diluted to a typical concentration of about 12.5%. Unlike a conventional operation, which is operated to use water as the intended material for dilution of the concentrated acid, in this example, our method uses fractions of liquid taken from a previous regeneration waste profile from a column. These fractions are the leading fraction stream of the previous regenerant waste profile and a trailing fraction stream of the previous regenerant waste profile. These individual fraction streams can be typically 5% to 25% of the total profile volume and together, up to 50% of the total profile volume.

7. The leading fraction stream is obtained by starting its collection approximately as the initial regenerant waste begins to leave a column. As will be understood by those of ordinary skilled in the art, this point can be determined when salts begin to appear in the regenerant waste profile, for example, by the sudden increase in fluid conductivity or increase in dissolved solids content. Either of these options can be monitored on-line with instruments that measure conductivity of the regenerant waste or dissolved solids in that waste. The leading fraction stream is then collected for a period of time which will yield approximately 5% to 25% of the total regenerant waste volume.

8. Leading fraction streams are recycled for use as dilution media for concentrated acid to be fed to the system. If desired, collected leading fraction streams can temporarily be stored in one or more tanks.

9. As the regenerant waste flow continues out of a column, a center fraction stream is then collected separately and represents a, typically, final regenerant waste to be sent forward for further processing, for example, neutralization. Center fraction streams typically are collected for a set time so that the desired amount of center fraction stream is easily determined.

10. A trailing fraction stream then starts, and center fraction stream collection ends, at a time which will yield a trailing fraction stream which by volume is approximately 5% to 25% of the total regenerant waste profile volume. Collection of the trailing fraction is ended at some desired endpoint, which can be total volume or optional conductivity or dissolved solids endpoint. As with the leading fraction streams, trailing fraction streams also may be recycled for use as dilution media for concentrated acid. If desired, trailing fraction streams can be sent to the same temporary storage tank as the leading fraction streams so that they are mixed prior to use as dilution media.

We believe that the material collected for dilution of regenerant in our method, particularly leading fraction streams, would be viewed by those of ordinary skill in the art as having no regenerant potential. Such a recycle of salt waste for the purpose of diluting regenerant would not be known to serve a purpose.

Also, from a conventional point of view the non-acidic salt solution taken from a leading fraction stream of a waste regenerant profile, rather than being useful, would be expected to deteriorate regeneration efficiency if it were to be added back to regenerant. The returned salt waste provides a counter ion to an acid driving force for regeneration. One of ordinary skill in the art would expect such a salt to somewhat force the resin back to sodium form and interfere with the acid exchange which is trying to remove sodium from the resin. This reasoning also applies to the trailing faction stream where only a small amount of acid is present for potential re-use somewhere in the process.

We have found that for typical acid concentrations for regeneration, for example in a CBMP application, the exchange back toward sodium form does not occur. We assume that the resin equilibrium in such an application very much favors the exchange to hydrogen form rather than equilibrating significantly to the counter sodium ion. In any case, our experimental work indicates that our method works, and that the concentrated acid regenerant may be diluted in our unconventional manner.

Because much of the material in the leading and tailing fraction streams of the regenerant waste profile is sent back, e.g., at each regeneration, for diluting concentrated acid, only the center fraction of the regenerant waste profile typically would be sent forward as final regenerant waste (brine). Using only, or substantially, the center of the regenerant waste profile as a final regenerant waste reduces total waste volume to levels comparable to the continuous and simulated continuous ion exchange methods. In addition, using only, or substantially, the center of the regenerant waste profile increases waste concentration to levels comparable to conventional continuous and simulated continuous ion exchange methods.

An experimental example on a pilot scale was conducted having the following parameters. The apparatus utilized was a conventional ion exchange column, whose general construction and operation is known to those of ordinary skill in the art.

| | |
|---|---|
| Ion exchange column height (inches) | 36 |
| Resin bed depth (inches) | 35 |
| Ion exchange column diameter (inches) | 2 |
| Strong cation resin used | Dow G-26 |
| Feed Water Na ppm | 1230 |
| Operating temperature (C.) | 25 |
| Water exhaustion flow rate (bed volumes/hour) | 18 |
| Undiluted HCl acid concentration (%) | 36 |
| Diluted HCl acid concentration (%) | 12.5 |
| Total regeneration waste profile volume (mls) | 1200 |
| Leading fraction volume recycled for concentrated acid dilution (mls) | 200 |
| Leading fraction volume as % of total profile volume (%) | 16.7 |
| Trailing fraction volume recycled for concentrated acid dilution (mls) | 200 |

-continued

| | |
|---|---|
| Trailing fraction volume as % of total profile volume (%) | 16.7 |
| Total regeneration waste profile recycled for acid dilution (%) | 33.3 |
| Center fraction (product waste brine) volume sent forward for processing (mls) | 800 |

The following results were obtained. Results indicate how efficiency factors can be adjusted depending upon the desired % sodium removal.

| Cumulative sodium removal (%) | Cumulative resin operating capacity (eq/liter) | Gallons product brine produced per barrel treated water | Gallons 36% HCl used per barrel treated water |
|---|---|---|---|
| 99.9 | 1.61 | 0.62 | 0.26 |
| 99.8 | 1.79 | 0.56 | 0.23 |
| 98.6 | 1.94 | 0.51 | 0.21 |
| 96.3 | 2.07 | 0.47 | 0.19 |
| 91.9 | 2.14 | 0.43 | 0.18 |

In the above table, the designation "barrel" refers to a container having a volume of 42 gallons. From the view of a commercial application, the above results are very competitive with existing continuous ion exchange methods.

In addition, an example of our method may involve the following steps. A batch ion exchange process where a regenerant waste profile exiting the process is collected as three streams comprising: a first leading fraction which is recycled for dilution of a concentrated regenerant or for dissolving a solid regenerant; a second center fraction which is a product regenerant waste sent forward for subsequent processing following ion exchange; and a third trailing fraction which is recycled for dilution of a concentrated regenerant or for dissolving a solid regenerant. Implementation of the above embodiment and others will involve use of equipment, material, and techniques known in the art, and will be understood by those of ordinary skill in the art given the teachings herein. It is expected that future embodiments of our method will also involve utilization of equipment, material, and techniques to be developed in the art, still within the scope of our invention.

Embodiments of our method may be utilized for treatment of water derived from the Coal Bed Methane Process, or other processes as appropriate.

Our method may use an ion exchange process which uses a strong cation exchange resin and/or a weak cation exchange resin as appropriate. Our method may involve a concentrated regenerant which is an acid selected from hydrochloric acid, sulfuric acid, phosphoric acid, or acetic acid. Our method may involve a leading fraction which is about 5% to 25% of the total profile volume. Our method may involve a trailing fraction which is about 5% to 25% of the total profile volume.

Our method may involve a continuous or simulated continuous ion exchange process where 5% to 25% of the exiting regenerant waste is collected and used for dilution of a concentrated regenerant or for dissolving a solid regenerant. Our method may also use an ion exchange process which is for treatment of water derived from the Coal Bed Methane Process, or other processes. It may also use an ion exchange process which uses a strong cation exchange resin and/or a weak cation exchange resin. It may also involve a concentrated regenerant as an acid selected from hydrochloric acid, sulfuric acid, phosphoric acid, or acetic acid.

Embodiments of our modified method of operating an ion exchange process are applicable to processes other than Coal Bed Methane Process. It is useful to consider the method if there is an advantage to producing less volume of regenerant waste and/or producing a higher concentration in regenerant waste. Note that, preferably, an embodiment of our method may involve the use of a regenerant which will be diluted before use in the method, or, where the regenerant is a solid, will be dissolved before use in the method.

Although continuous or simulated continuous ion exchange processes generally are able to obtain minimum waste volume and maximum waste concentration, we recognize that our invention can be applied to these ion exchange methods to obtain benefit. However, the benefit will then need to compete with the less expensive and simpler to operate batch process using our invention.

It is believed that when an embodiment of our method is applied to continuous or simulated continuous processes, a fraction stream of the regenerant waste stream may be returned for dilution of the concentrated regenerant. As with a batch process application, the returned waste fraction streams need not contain any acid potential for regeneration. For this use we recommend return of approximately 5% to 25% of the exiting waste.

While examples of our method have been described above, the description is not intended to be limiting to the scope of coverage of claims which an examiner determines are allowable and accordingly supported by the description. Persons of ordinary skill in the art should read the disclosure sufficiently broad to describe and/or support the inventions claimed. Examples of our method may be practiced in other embodiments, systems, apparatus, or applications not expressly described here as will be appreciated by those of ordinary skill in the art, as well as future embodiments still within the scope of coverage of our invention.

What is claimed is:

1. A batch ion exchange process wherein the regenerant waste profile exiting the process is collected as three fractions comprising:
  a first leading fraction which is recycled for dilution of a concentrated regenerant or for dissolving a solid regenerant;
  a second center fraction which is the product regenerant waste sent forward for subsequent processing following ion exchange; and
  a third trailing fraction which is recycled for dilution of a concentrated regenerant or for dissolving a solid regenerant.

2. The process of claim 1, wherein the ion exchange process is for treatment of water derived from the Coal Bed Methane Process.

3. The process of claim 1, wherein the ion exchange process uses a strong cation exchange resin.

4. The process of claim 1, wherein the ion exchange process uses a weak cation exchange resin.

5. The process of claim 1, wherein the concentrated regenerant is an acid selected from the group: hydrochloric acid, sulfuric acid, phosphoric acid, and acetic acid.

6. The process of claim 1, wherein the leading fraction is about 5% to 25% of the total profile volume.

7. The process of claim 1, wherein the trailing fraction is about 5% to 25% of the total profile volume.

8. A continuous or simulated continuous ion exchange process wherein 5% to 25% of the exiting regenerant waste is collected and used for dilution of a concentrated regenerant or for dissolving a solid regenerant.

9. The process of claim 8, wherein the ion exchange process is for treatment of water derived from the Coal Bed Methane Process.

10. The process of claim 8, wherein the ion exchange process uses a strong cation exchange resin.

11. The process of claim 8, wherein the ion exchange process uses a weak cation exchange resin.

12. The process of claim 8, wherein the concentrated regenerant is an acid selected from the group: hydrochloric acid, sulfuric acid, phosphoric acid, and acetic acid.

13. A continuous or simulated continuous exchange process comprising:
  providing a column filled with a strong or weak cation resin bed in the hydrogen form;
  passing a quantity of liquid through said column exchanging the hydrogen in the resin for cations in the liquid; and
  regenerating the resin in the column with an acid by passing a quantity of acid through the column, said acid being diluted prior to its passage through said column by liquid which has previously passed through said column and now forms part of a previous regenerant waste profile.

14. The process of claim 13 wherein said liquid which forms part of a regenerant waste profile is taken from a leading fraction of the regenerant waste profile.

15. The process of claim 14 wherein the leading fraction of the regenerant waste constitutes about 5% to about 25% of the total regenerant waste profile.

16. The process of claim 13 wherein said liquid which forms part of said regenerant waste profile is taken from a trailing fraction of the regenerant waste profile.

17. The process of claim 16 wherein said trailing fraction of the regenerant waste profile constitutes about 5% to about 25% of the total regenerant waste profile.

18. The process of claim 13 wherein said liquid which forms part of a regenerant waste profile is taken from a leading fraction of the regenerant waste profile and a trailing fraction of the regenerant waste profile.

19. The process of claim 18 wherein said liquid which forms part of a regenerant waste profile constitutes up to about 50% of the regenerant waste profile.

* * * * *